(12) United States Patent
Park

(10) Patent No.: US 11,822,361 B2
(45) Date of Patent: Nov. 21, 2023

(54) OPERATING DEVICE

(71) Applicant: KORTEK CORPORATION, Incheon (KR)

(72) Inventor: Moon Bae Park, Suwon-si (KR)

(73) Assignee: KORTEK CORPORATION, Incheon (KR)

( * ) Notice: Subject to any disclaimer, the term of this patent is extended or adjusted under 35 U.S.C. 154(b) by 141 days.

(21) Appl. No.: 17/600,137

(22) PCT Filed: Mar. 10, 2020

(86) PCT No.: PCT/KR2020/003332
§ 371 (c)(1),
(2) Date: Sep. 30, 2021

(87) PCT Pub. No.: WO2020/204380
PCT Pub. Date: Oct. 8, 2020

(65) Prior Publication Data
US 2022/0171422 A1    Jun. 2, 2022

(30) Foreign Application Priority Data

Apr. 4, 2019  (KR) .................. 10-2019-0039531
Aug. 5, 2019  (KR) .................. 10-2019-0094761

(51) Int. Cl.
*G05G 1/02*  (2006.01)
*A63F 13/24*  (2014.01)

(52) U.S. Cl.
CPC .............. *G05G 1/02* (2013.01); *A63F 13/24* (2014.09)

(58) Field of Classification Search
CPC ........ H01H 13/04; H01H 13/10; H01H 13/14; H01H 2003/145; H01H 3/12; H01H 3/20; G05G 1/02

USPC ........................................... 200/43.16–43.19
See application file for complete search history.

(56) References Cited

U.S. PATENT DOCUMENTS

| 8,129,638 B2* | 3/2012 | Puri ...................... H02B 1/044 200/43.16 |
| 8,859,917 B2* | 10/2014 | Li ........................... H01H 3/20 200/321 |
| 9,064,646 B2* | 6/2015 | Wavering ............... H01H 9/286 |

(Continued)

FOREIGN PATENT DOCUMENTS

| JP | 06-023129 U | 3/1994 |
| JP | 2003-308756 A | 10/2003 |
| JP | 2016-207295 A | 12/2016 |

(Continued)

OTHER PUBLICATIONS

PCT International Search Report for PCT Application No. PCT/KR2020/003332, dated Jun. 17, 2020.

*Primary Examiner* — Thomas C Diaz
(74) *Attorney, Agent, or Firm* — Schmeiser, Olsen & Watts, LLP

(57) ABSTRACT

Provided is an operating device comprising: an operating part for receiving an operating signal; a frame part having an inner hole part into which the operating part is inserted; a lock part rotatably provided to the frame part, and inserted into a side surface of the operating part by a rotating operation so as to restrict the movement of the operating part; and a moving part which is connected to the lock part and which moves in a linear direction or rotates the lock part by a rotating operation.

7 Claims, 10 Drawing Sheets

(56) References Cited

U.S. PATENT DOCUMENTS

| | | | |
|---|---|---|---|
| 11,024,476 B2 * | 6/2021 | Ogawa | H01H 13/52 |
| 11,378,996 B2 * | 7/2022 | Lee | H01H 13/10 |

FOREIGN PATENT DOCUMENTS

| | | |
|---|---|---|
| KR | 100504259 B1 | 7/2005 |
| KR | 20-0434973 Y1 | 7/2006 |
| KR | 10-0790156 B1 | 1/2008 |

* cited by examiner

OPERATING DEVICE

CROSS-REFERENCE TO RELATED APPLICATIONS

This application claims priority to PCT Application No. PCT/KR2020/003332, having a filing date of Mar. 10, 2020, which claims priority to KR 10-2019-0094761, having a filing date of Aug. 5, 2019, and KR 10-2019-0039531, having a filing date of Apr. 4, 2019, the entire contents all of which are hereby incorporated by reference.

FIELD OF TECHNOLOGY

The following relates to an operating device, and more particularly, to an operating device that allows an operation part to be quickly and easily installed and disassembled.

BACKGROUND

In general, display units are installed in game devices, and operation parts are fixed to the display units. Push operation parts are connected to circuit boards by electrical wires, and as signals of the push operation parts are input to the circuit boards, specific functions are selected. Such push operation parts may fail due to impacts or the like.

However, in the related art, since the push operation part is fixed to the display unit, when repair is required due to a failure of the push operation part, operations of separating the entire display unit from the game device and then transporting the display unit to a repair company are required.

At the repair company, the operation part is repaired or replaced and then is sent to a client, and the display unit is reinstalled in the game device. Thus, maintenance costs and working time increase. Therefore, it is necessary to reduce this problem.

The background technology is disclosed in Korean Utility Model No. 20-0434973 (registered on Dec. 26, 2006, titled: Unmanned operating device of operation button of game console).

SUMMARY

An aspect relates to an operating device that allows an operation part to be quickly and easily installed and disassembled, and thus maintenance costs can be reduced.

An aspect of embodiments of the present invention provides an operating device including an operation part that transmits a manipulation signal, a frame part that has an inner hole part into which the operation part is inserted, a locking part that is rotatably installed in the frame part and is inserted into a side surface of the operation part through a rotation operation to restrain movement of the operation part, and a moving part that is connected to the locking part and rotates the locking part by linear movement or rotation.

The frame part may include a first frame located on one side of the locking part, a second frame located on the other side of the locking part facing the first frame, and a hinge protrusion which protrudes in a direction from the second frame toward the first frame and in which the locking part is rotatably installed.

The locking part may include a locking body that is rotatably installed in the hinge protrusion and is installed at a position facing the operation part inserted into the inner hole part, a protrusion part that protrudes from the locking body and is caught by a restraint groove part provided in a side surface of the operation part, and a connection hole part that forms a long hole, into which the moving part is inserted, inside the locking body.

The moving part may include a moving body that is moved in a linear direction, and a moving protrusion that protrudes from the moving body and is inserted into the connection hole part.

The connection hole part may be installed to be inclined with respect to a linear movement direction of the moving protrusion.

The locking body and the hinge protrusion may be provided as two locking bodies and two hinge protrusions, and the locking bodies may be located on both sides of the operation part.

The locking part may include a rotation body that is rotatably installed in the hinge protrusion and is installed at a position facing the operation part inserted into the inner hole part, an extension protrusion that protrudes from the rotation body, is inserted into the moving part, and is moved together with the rotation body by the rotation of the moving part, and a restraint protrusion part that protrudes from the rotation body and is caught by a restraint groove part provided in the side surface of the operation part.

The moving part may include a base part that is rotatably installed at a position facing the extension protrusion, and a guide hole part that forms a hole part, into which the extension protrusion is inserted, inside the base part.

The rotation body and the hinge protrusion may be provided as two rotation bodies and two hinge protrusions, and the rotation bodies may be located on both sides of the operation part.

In an operating device according to embodiments of the present invention, a locking part is rotated by rotation or movement of a moving part to restrain movement of an operation part or easily release the restraint of the operation part, and thus maintenance costs can be reduced, and work time can be also shortened.

Further, according to embodiments of the present invention, since only the operation part can be separated from a glass part and repaired or replaced, an operation of moving the glass part together with the operation part is omitted, and thus maintenance costs and work time for the operation part can be reduced.

BRIEF DESCRIPTION

Some of the embodiments will be described in detail, with reference to the following figures, wherein like designations denote like members, wherein.

DETAILED DESCRIPTION

Figure 1:
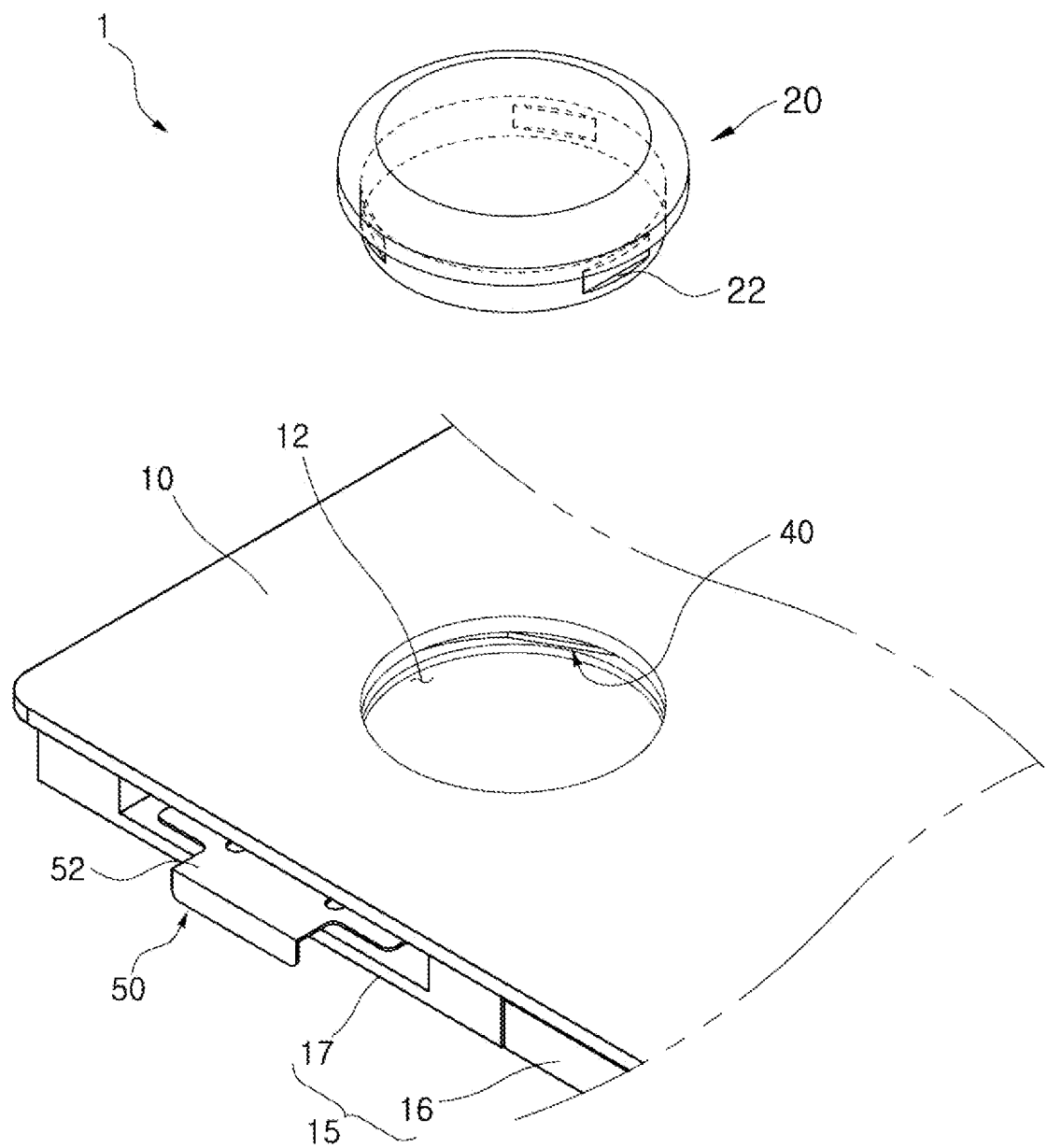
FIG. 1 is a perspective view illustrating a state in which an operation part is separated from an operating device according to a first embodiment of the present invention.

Hereinafter, an operating device according to one embodiment of the present invention will be described with reference to the accompanying drawings. In this process, the thickness of lines or the size of components illustrated in the drawings may be exaggerated for clarity and convenience of description.

Further, terms described below are defined in consideration of functions in embodiments of the present invention and may change according to the intention or custom of a user or an operator. Therefore, definitions of these terms should be made based on the contents throughout the present specification.

Figure 2:
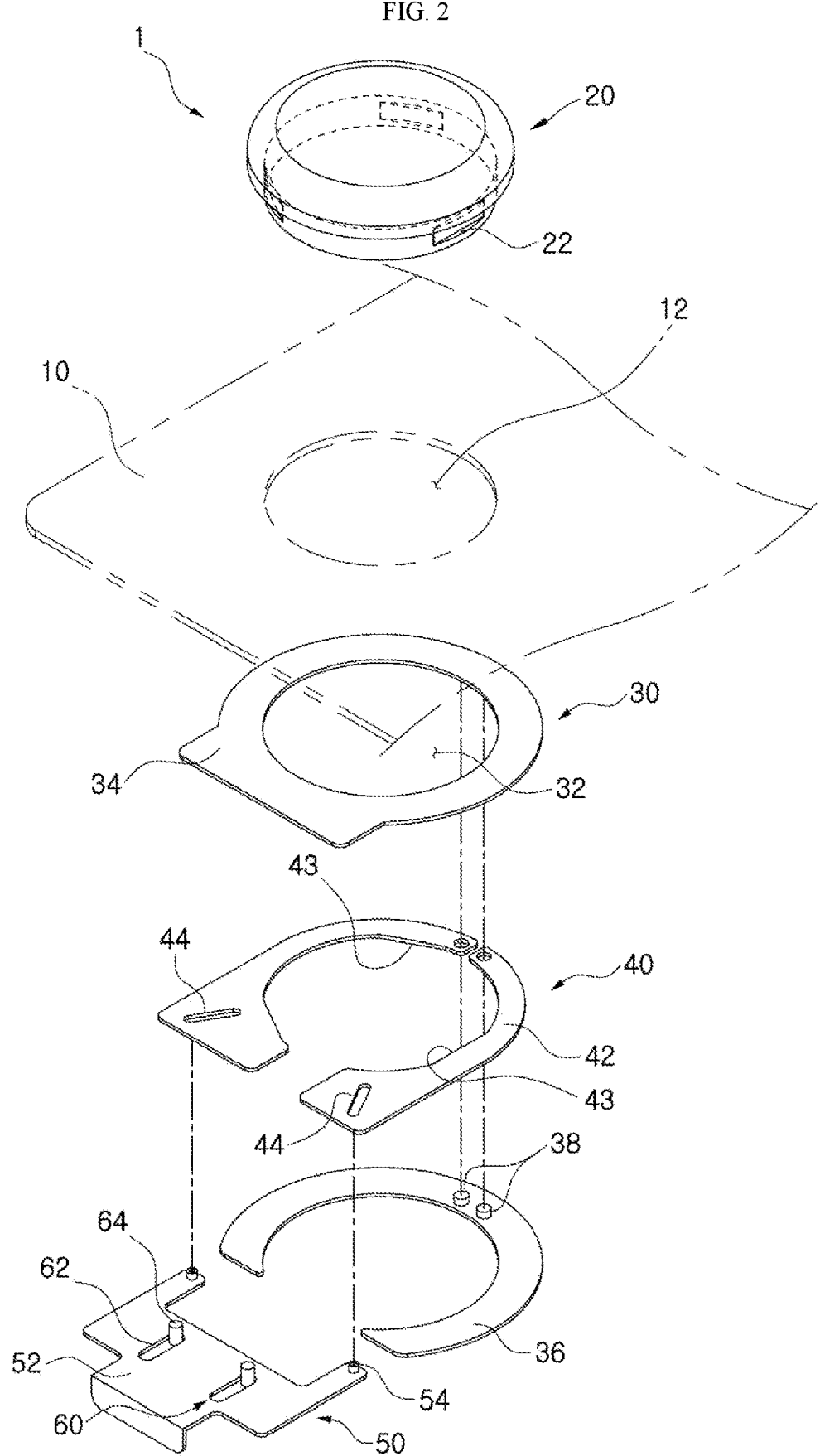
FIG. 2 is an exploded perspective view of the operating device according to the first embodiment of the present invention.
Figure 3:
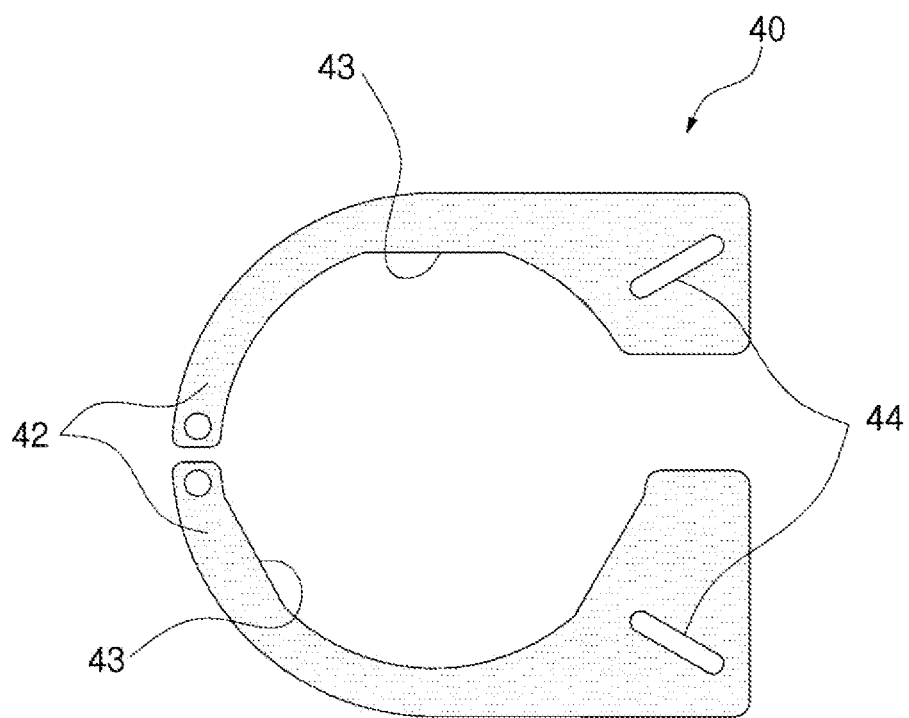
FIG. 3 is a plan view illustrating a locking part according to the first embodiment of the present invention.
Figure 4:
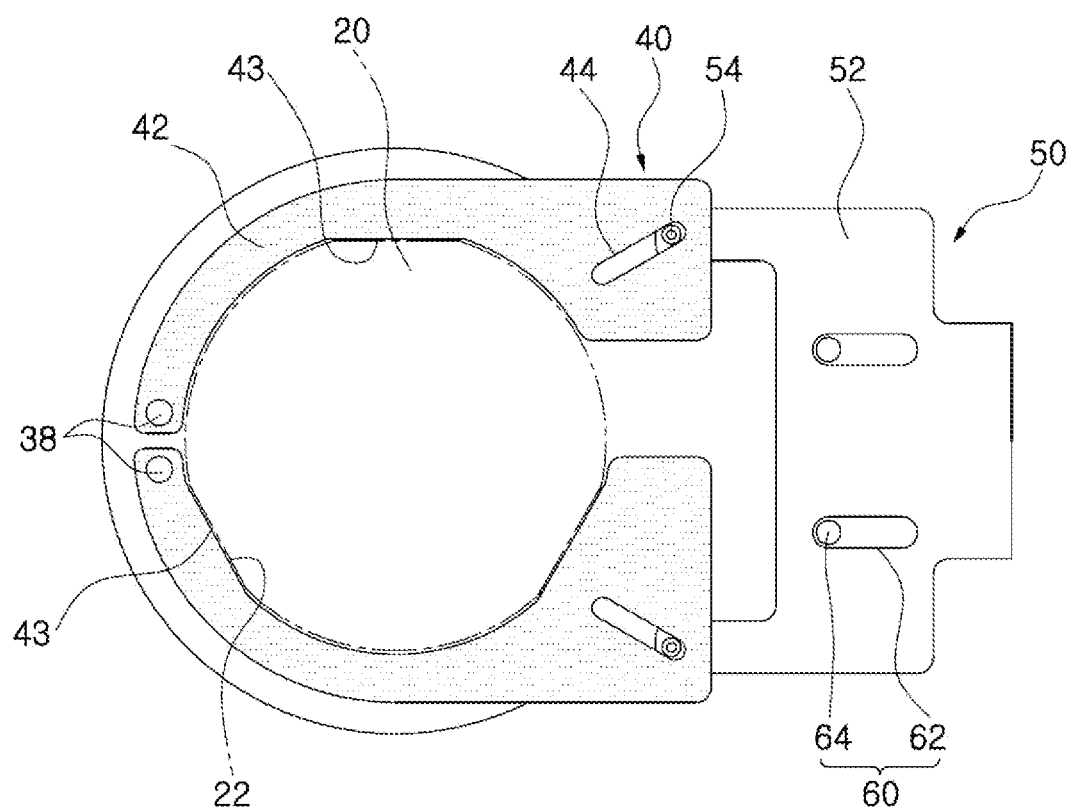
FIG. 4 is a view illustrating a state in which the locking part restricts movement of the operation part according to the first embodiment of the present invention.
Figure 5:
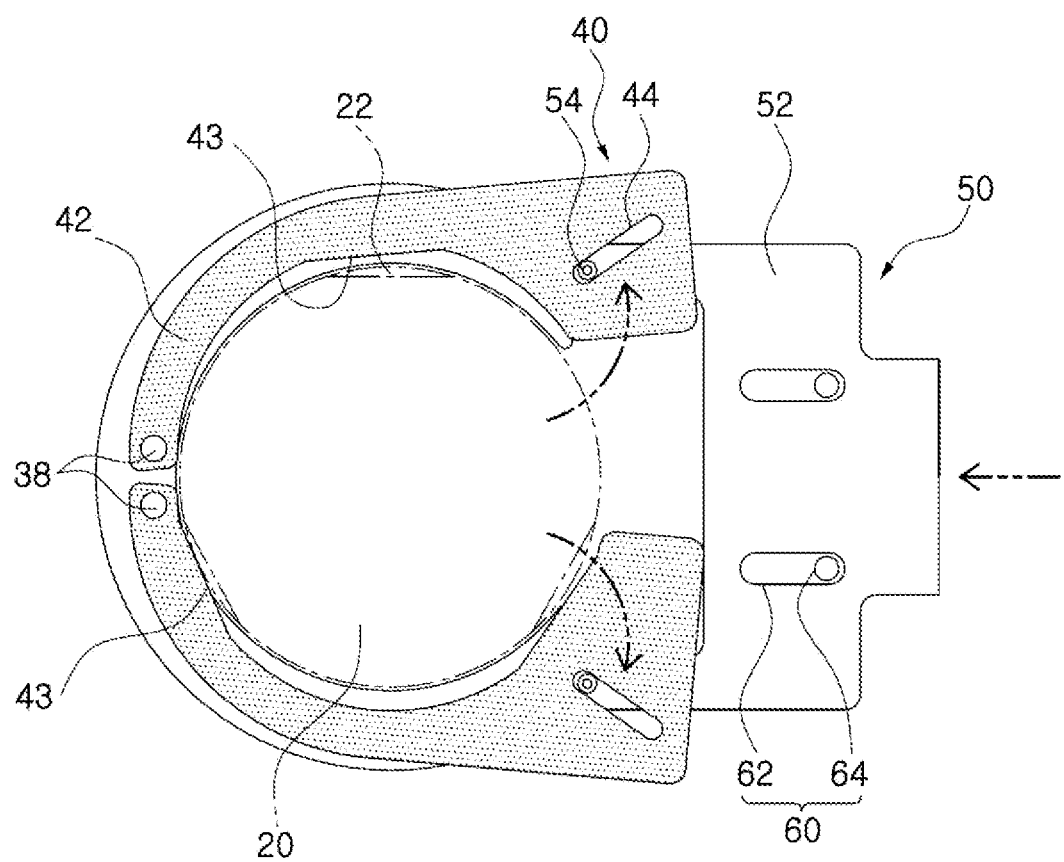
FIG. 5 is a view illustrating a state in which, due to linear movement of a moving part, the locking part is rotated, and the operation part is thus unlocked according to the first embodiment of the present invention.

FIG. 1 is a perspective view illustrating a state in which an operation part is separated from an operating device according to a first embodiment of the present invention, FIG. 2 is an exploded perspective view of the operating device according to the first embodiment of the present invention, FIG. 3 is a plan view illustrating a locking part according to the first embodiment of the present invention, FIG. 4 is a view illustrating a state in which the locking part restricts movement of the operation part according to the first embodiment of the present invention, and FIG. 5 is a view illustrating a state in which, due to linear movement of a moving part, the locking part is rotated, and the operation part is thus unlocked according to the first embodiment of the present invention.

As illustrated in FIGS. 1 to 5, an operating device 1 according to one embodiment of the present invention includes an operation part 20 that transmits a manipulation signal and has a restraint groove part 22 on a side surface thereof, a frame part 30 that has an inner hole part 32 into which the operation part 20 is inserted, a locking part 40 that is rotatably installed in the frame part 30 and is inserted into the side surface of the operation part 20 by a rotation operation to restrict movement of the operation part 20, a moving part 50 that is connected to the locking part 40 and rotates the locking part 40 by linear movement or rotation, and a guide part 60 that guides the movement of the moving part 50.

As one embodiment, the operating device 1 may be applied to a button device used in a casino machine or the like.

A display unit 15 includes a display panel 16 that outputs an image and a mounting housing part 17 forming a space, in which the frame part 30 is installed, on one side of the display panel 16. The plate-shaped glass part 10 is disposed in front of the display unit 15 and the mounting housing part 17.

The glass part 10 is installed to be spaced apart from the display unit 15 to secure visibility. Further, the insertion hole part 12 is formed in the glass part 10 so that the operation part 20 is insertable thereinto. Since the insertion hole part 12 is formed in the same shape as the circumference of the operation part 20, rotation is restricted while a body of the operation part 20 is inserted into the insertion hole part 12.

The operation part 20 is installed in the insertion hole part 12 of the glass part 10 installed in front of the display unit 15. Further, a stepped portion may be additionally formed at the circumference of the operation part 20 to limit the depth of insertion into the insertion hole part 12.

The operation part 20 is connected to a controller by electric wires and transmits a manipulation signal to the controller. The cross section of the operation part 20 and the insertion hole part 12 are formed in a circular shape and may also be formed in any shape including a quadrangle or a triangle in addition thereto. The operation part 20 according to a first embodiment is formed in a circular shape and extends vertically.

The operation part 20 may be a button that has a circular cross section and extends vertically and may have a cross section having a polygonal shape including a quadrangle or the shape of the operation part 20 may be changed to one of various shapes such as an ellipse and a triangle.

Further, a plurality of restraint groove parts 22, which the locking part 40 is to be inserted into and engaged with, are formed around the operation part 20 in a circumferential direction. The restraint groove parts 22 according to the first embodiment are formed on the side surface of the operation part 20 facing a protrusion part 43 of the locking part 40.

Thus, when the protrusion part 43 of the locking part 40 is inserted into and caught by the restraint groove parts 22, the operation part 20 does not escape from the insertion hole part 12 of the glass part 10.

The frame part 30 may be modified into any shape without departing from the technical spirit of having the inner hole part 32 into which the operation part 20 is inserted. The frame part 30 according to the first embodiment includes a first frame 34 located on one side (upper side in FIG. 2) of the locking part 40, a second frame 36 located on the other side (lower side in FIG. 2) of the locking part 40 facing the first frame 34, and a hinge protrusion 38 which protrudes in a direction from the second frame 36 toward the first frame 34 and in which the locking part 40 is rotatably installed.

The first frame 34 is located below the glass part 10, and the locking part 40 and the second frame 36 are sequentially installed below the first frame 34. The second frame 36 is coupled to the first frame 34, and a space in which the locking part 40 is to be moved is formed between the first frame 34 and the second frame 36.

The inner hole part 32 in which the operation part 29 is to be installed is provided inside the first frame 34, and the locking part 40 is rotatably installed in the hinge protrusion 38 protruding upward from the second frame 36. The second frame 36 is fixed to the mounting housing part 17 or is fixed to a separate fixed member.

The locking part 40 is rotatably installed in the frame part 30 and may variously be modified without departing from the technical spirit of being inserted into the restraint groove parts 22 provided on the side surface of the operation part 20 and restraining the movement of the operation part 20 through rotation. The locking part 40 according to the first embodiment includes a locking body 42 that is rotatably installed in the hinge protrusion 38 and is installed at a position facing the operation part 20 inserted into the inner hole part 32, a protrusion part 43 that protrudes from the locking body 42 and is caught by the restraint groove parts 22 provided on the side surface of the operation part 20, and a connection hole part 44 that forms a long hole, into which the moving part 50 is inserted, inside the locking body 42.

Since the protrusion-shaped protrusion part 43 is provided inside the locking body 42 facing the restraint groove parts 22, the locking body 42 may be inserted into the restraint groove parts 22 to restrain movement of the operation part 20.

The restraint groove parts 22 form grooves to be spaced apart from each other along the periphery of the side surface of the operation part 20, and the protrusion part 43 protrudes inward from the locking body 42 and is caught by the inner side of the restraint groove parts 22. By rotation of the locking body 42, the protrusion part 43 is also moved and is thus caught or released by the restraint groove parts 22.

The protrusion part 43 may be variously modified in a manner of protruding inward from the locking body 42 in a protrusion shape, protruding in a plate shape, or the like.

The locking body 42 has a curved shape while surrounding the circumference of the operation part 2, and the protrusion part 43 protruding inward from the locking body 42 has a plate shape.

Two locking bodies 42 and two hinge protrusions 38 according to the first embodiment are provided, and the locking bodies 42 are located on both sides of the operation part 20. The locking body 42 is rotated about the hinge protrusion 38 and is, through the rotation operation, caught by the insertion hole part 12 of the operation part 20 to restrain the movement or the operation part 20 or spaced apart from the operation part 20 to unlock the operation part 20.

The pair of locking bodies 42 extend in a plate shape surrounding one side and the other side of the operation part 20, one side of the locking body 42 is connected to the hinge protrusion 38, and the connection hole part 44 is formed on the other side thereof. Since the connection hole part 44 is installed to be inclined with respect to the linear movement direction of a moving protrusion 54, the locking body 42 is rotated by the linear movement of the moving protrusion 54 moved together with the moving part 50.

The connection hole part 44 is obliquely installed to form an acute angle with respect to an imaginary line extending in the movement direction of the moving protrusion 54.

The moving part 50 is connected to the locking part 40 and may variously be modified without departing from the technical spirit of rotating the locking part 40 by being moved in the linear direction or being rotated. The moving part 50 according to the first embodiment includes a moving body 52 moved in the linear direction and the moving protrusion 54 protruding from the moving body 52 and inserted into the connection hole part 44.

The moving body 52 according to the first embodiment has a plate shape and moves linearly on the mounting housing part 17. Since one side of the moving body 52 protrudes outward from the mounting housing part 17, the operator may move the moving body 52 while directly holding the moving body 52, and the moving body 52 connected to a separate driving device may move linearly.

Since the moving protrusion 54 protruding upward from the moving body 52 is inserted into the connection hole part 44, the locking part 40 is rotated due to the linear movement of the moving body 52.

The guide part 60 may be formed in any shape without departing from the technical spirit of guiding the linear movement of the moving part 50. The guide part 60 according to the first embodiment includes a guide hole part 62 that forms a long hole inside the moving body 52 and a guide protrusion 64 that vertically passes through the guide hole part 62 and is fixed.

A plurality of guide hole parts 62 are provided inside the moving body 52 and are long holes extending in the movement direction of the moving body 52. The guide protrusion 64 has a cylindrical shape extending vertically and may be variously modified in a manner of being fixed to a member extending from the frame part 30, being fixed to the mounting housing part 17, or the like.

Meanwhile, in the first embodiment, an example of the plurality of locking bodies 42 has been described. However, this is merely illustrative, and it is apparent that, even when one locking body 42 is provided, the purpose of embodiments of the present invention may be sufficiently achieved.

Hereinafter, an operation state of the operating device 1 according to the first embodiment of the present invention will be described in detail with reference to the accompanying drawings.

When the operation part 20 is unlocked, the moving part 50 is moved to a direction in which the operation part 20 is installed. Since the position of the connection hole part 44 facing the moving protrusion 54 varies due to the linear movement of the moving protrusion 54 moved together with the moving body 52, the locking body 42 rotates about the hinge protrusion 38.

As illustrated in FIG. 5, since the locking body 42 rotates in a direction away from the operation part 20, the protrusion part 43 is separated from the restraint groove part 22 of the operation part 20, and thus the operation part 20 is unlocked. Thus, the operator extracts the operation part 20 from the glass part 10 and then may perform a maintenance operation.

When the movement of the operation part 20 is restrained, the moving part 50 is moved toward the outside of the mounting housing part 17. Since the moving part 50 is moved in a direction away from the operation part 20, the moving protrusion 54 is moved in a direction toward an end of the connection hole part 44 to rotate the locking part 40.

As illustrated in FIG. 4, since the locking body 42 rotates in a direction of being in contact with the side surface of the operation part 20, the protrusion part 43 of the locking part 40 is caught by the restraint groove part 22 of the operation part 20, and thus the movement of the operation part 20 is restrained.

Hereinafter, an operating device 5 according to a second embodiment of the present invention will be described with reference to the accompanying drawings.

For convenience of description, components having the same configuration and operation as those of the first embodiment of the present invention are referred to by the same reference numerals, and detailed description thereof will be omitted.

Figure 6:
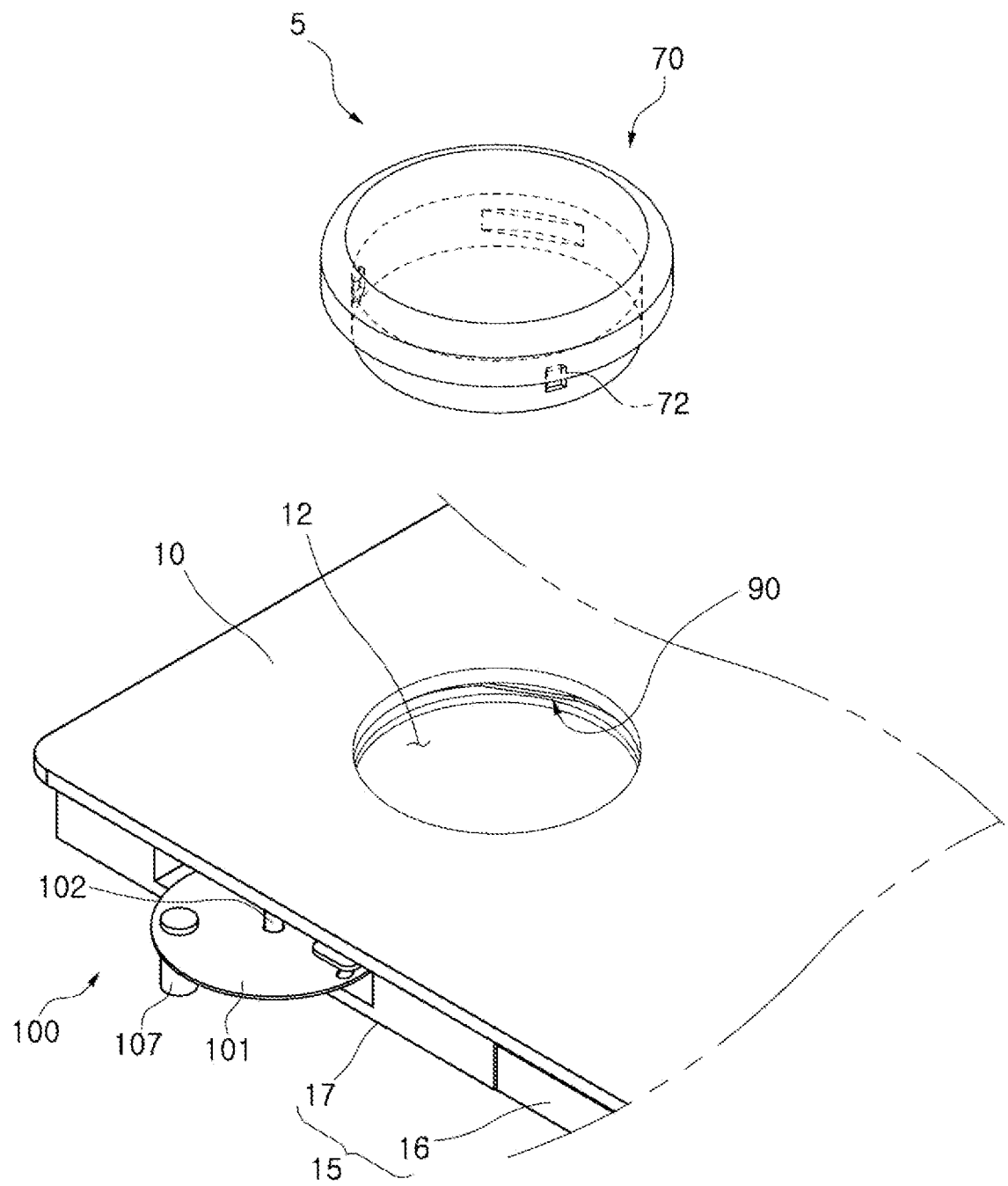
FIG. 6 is a perspective view illustrating a state in which an operation part is separated from an operating device according to a second embodiment of the present invention.
Figure 7:
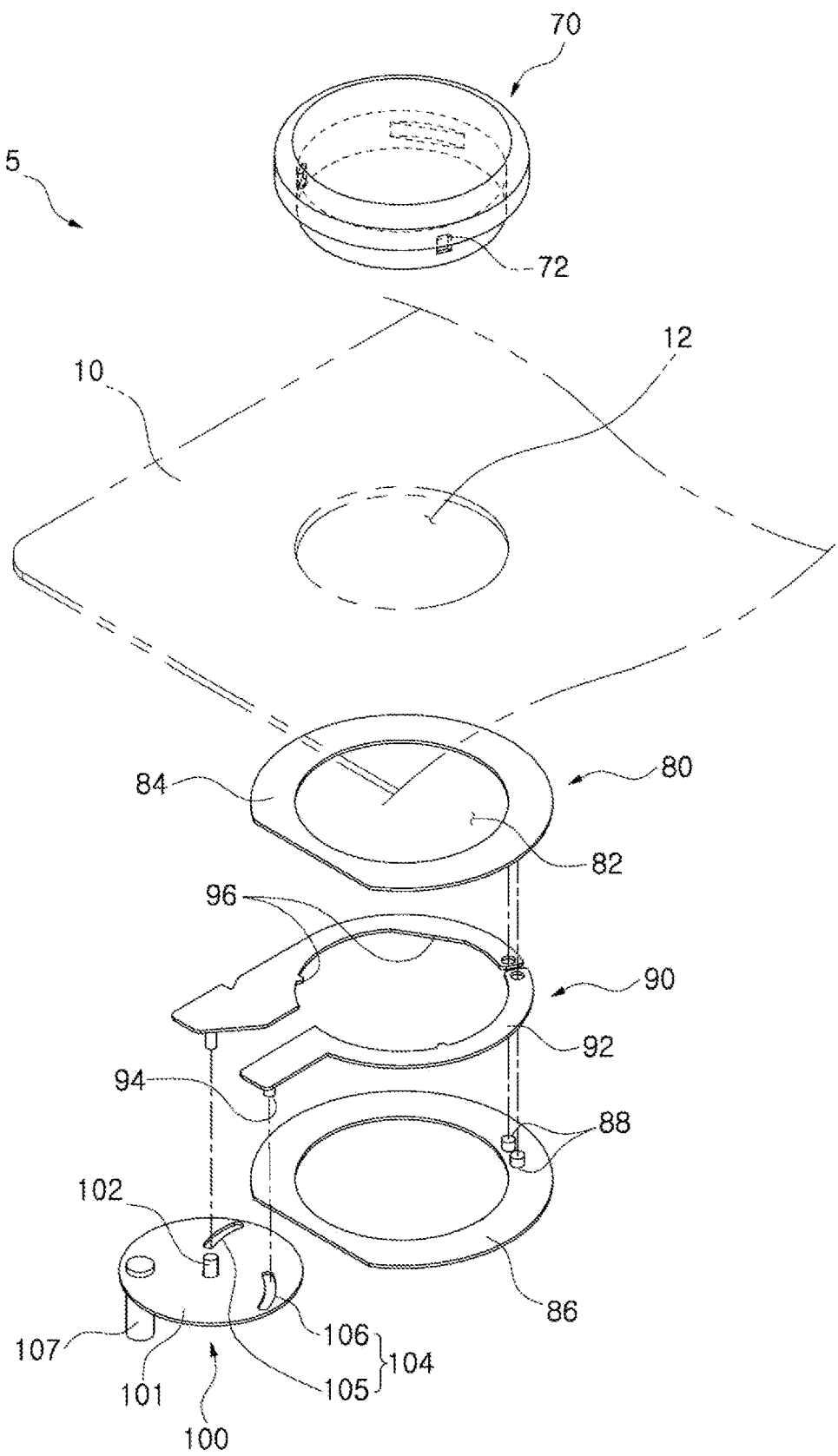
FIG. 7 is an exploded perspective view of an operating device according to the second embodiment of the present invention
Figure 8:
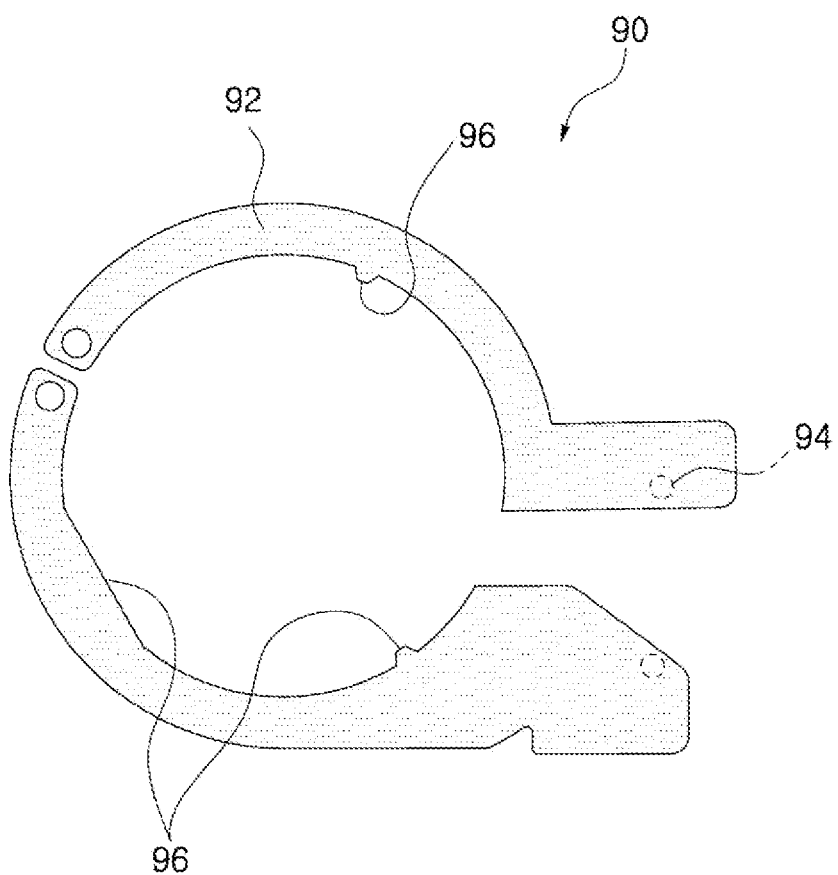
FIG. 8 is a plan view illustrating a locking part according to the second embodiment of the present invention.
Figure 9:
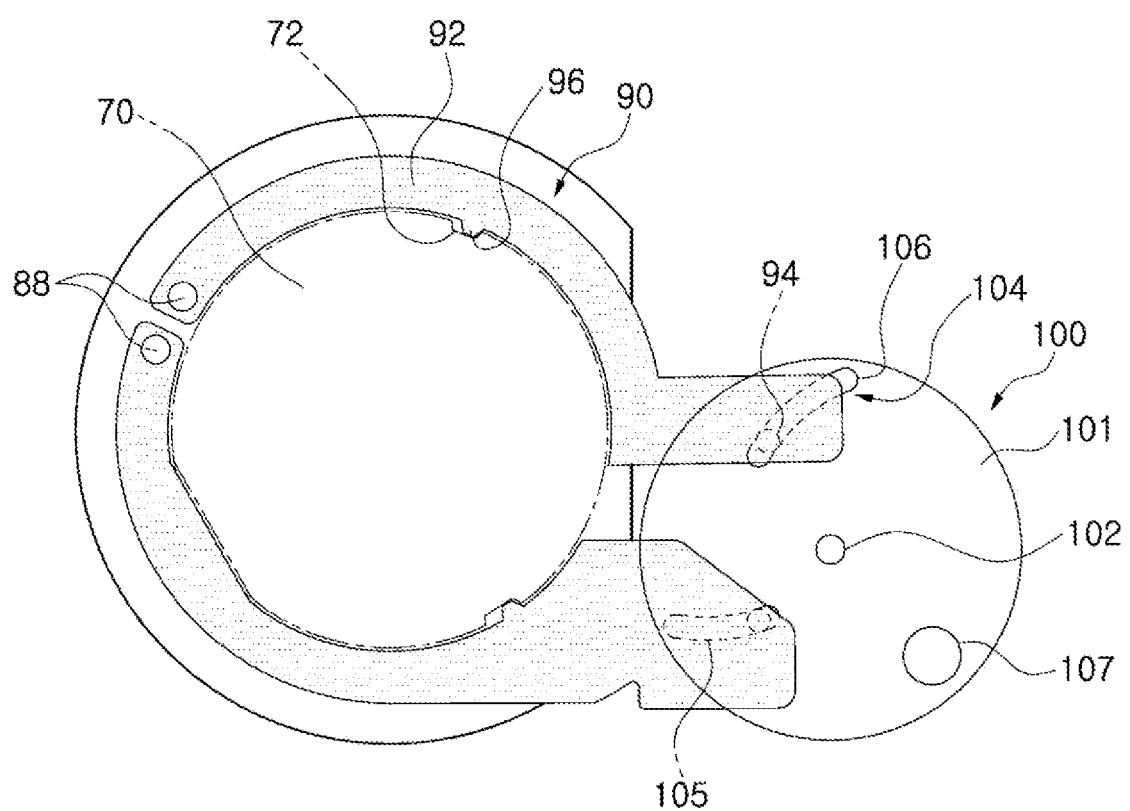
FIG. 9 is a view illustrating a state in which the locking part restricts movement of the operation part according to the second embodiment of the present invention and FIG. 10 is a view illustrating a state in which, due to rotation of a moving part, the locking part is rotated, and the operation part is thus unlocked according to the second embodiment of the present invention.
Figure 10:
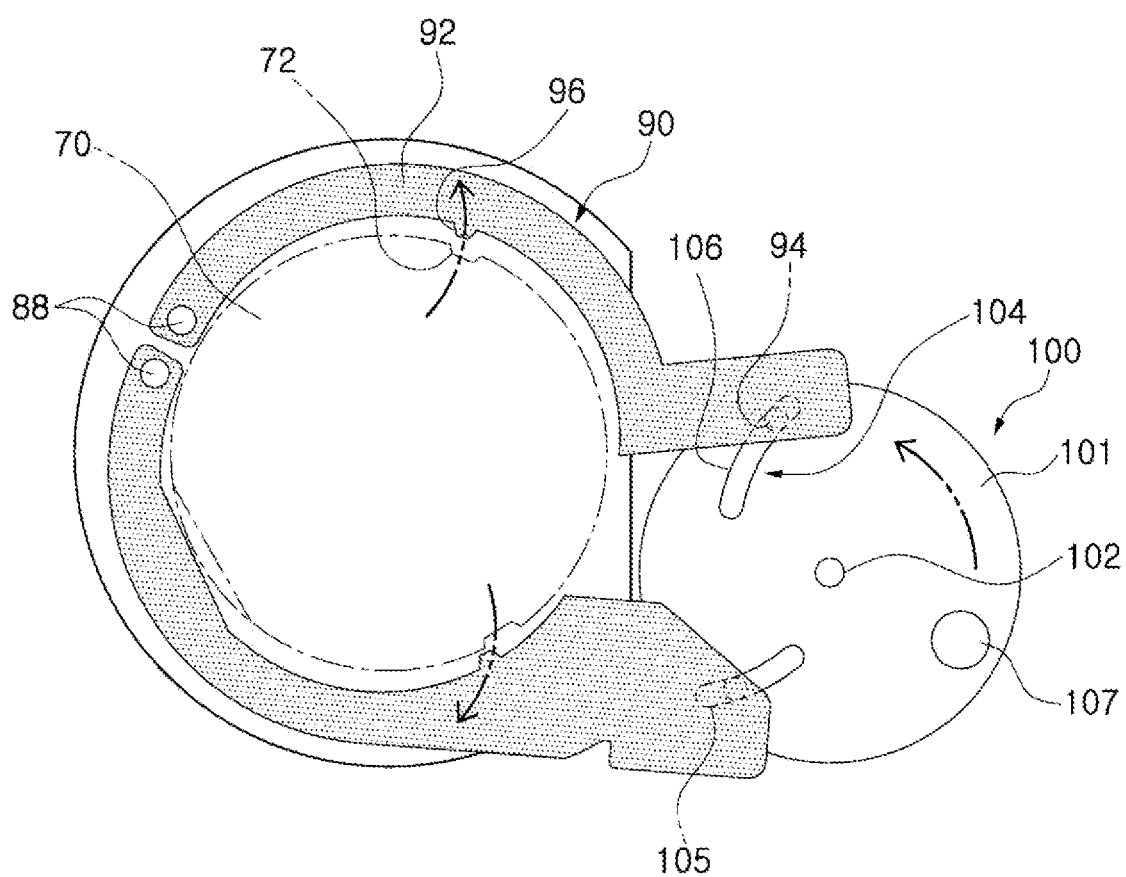

FIG. 6 is a perspective view illustrating a state in which an operation part is separated from an operating device according to a second embodiment of the present invention, FIG. 7 is an exploded perspective view of an operating device according to the second embodiment of the present invention, FIG. 8 is a plan view illustrating a locking part according to the second embodiment of the present invention, FIG. 9 is a view illustrating a state in which the locking part restricts movement of the operation part according to the second embodiment of the present invention, and FIG. 10 is a view illustrating a state in which, due to rotation of a moving part, the locking part is rotated, and the operation part is thus unlocked according to the second embodiment of the present invention.

As illustrated in FIGS. 6 to 10, the operating device 5 according to the second embodiment includes an operation part 70, a frame part 80, a locking part 90, and a moving part 100.

The operation part 70 according to the second embodiment has a similar shape to the operation part 20 according to the first embodiment, and the position and shape of a restraint groove part 72, by which the locking part 90 is to be caught, is different. The concave restraint groove part 72 is provided on the side surface of the operation part 70 according to the second embodiment. A plurality of restraint groove parts 72 are installed in a circumferential direction along the side surface of the operation part 70.

The frame part 80 according to the second embodiment may be modified into any shape without departing from the technical spirit of having an inner hole part 82 into which the operation part 70 is inserted. The frame part 80 according to the second embodiment includes a first frame 84 located on one side (upper side in FIG. 7) of the locking part 90, a second frame 86 located on the other side (lower side in FIG. 7) of the locking part 90 facing the first frame 84, and a hinge protrusion 88 which protrudes in a direction from the second frame 86 toward the first frame 84 and in which the locking part 90 is rotatably installed.

The first frame 84 is located below the glass part 10, and the locking part 90 and the second frame 86 are sequentially installed below the first frame 84. The second frame 86 is coupled to the first frame 84, and a space in which the locking part 90 is to be moved is formed between the first frame 84 and the second frame 86.

The inner hole part 82 in which the operation part 70 is to be installed is provided inside the first frame 84, and the locking part 90 is rotatably installed in the hinge protrusion 88 protruding upward from the second frame 86. The second frame 86 is fixed to the mounting housing part 17 or is fixed to a separate fixed member.

The locking part 90 according to the second embodiment includes a rotation body 92 which is rotatably installed in the hinge protrusion 88 and is installed at a position facing the operation part 79 inserted into the inner hole part 82, an extension protrusion 94 which protrudes from the rotation body 92, is inserted into the moving part 100, and is moved together with the rotation body 92 due to the rotation of the moving part 100, and a restraint protrusion part 96 which protrudes from the rotation body 92 in a protrusion shape and is caught by the restraint groove part 72 provided on the side surface of the operation part 70.

The restraint protrusion part 96 is installed at a position facing the restraint groove part 72 and is caught by the restraint groove part 72 to restrict the movement of the operation part 70.

The restraint protrusion part 96 protruding inward from the rotation body 92 may include a protrusion shape protruding toward the restraint groove part 72 and a plate shape protruding toward the restraint groove part 72.

Two rotation bodies 92 and two hinge protrusions 88 according to the second embodiment are provided, and the rotation bodies 92 are located on both sides of the operation part 70. The rotation body 92 is rotated about the hinge protrusion 88 and is, through the rotation operation, caught by the insertion hole part 12 of the operation part 70 to restrain the movement or the operation part 70 or spaced apart from the operation part 70 to unlock the operation part 70.

The pair of rotation bodies 92 extend in a plate shape surrounding one side and the other side of the operation part 70, one side of the rotation body 92 is connected to the hinge protrusion 88, and the other side thereof is connected to the extension protrusion 94. A guide groove part 104 of the moving part 100 into which the extension protrusion 94 is inserted extends along a curved shape.

The moving part 100 according to the second embodiment includes a base part 101, the guide groove part 104, and an input protrusion 107. The base part 101 has a disc shape that is rotatably installed at a position facing the extension protrusion 94. A base central shaft 102 vertically passing through the rotation center of the base part 101 is inserted into a fixed member such as the frame part 80 or the mounting housing part 17 to be rotatably installed.

The guide groove part 104 may be formed in any shape without departing from the technical spirit of forming a hole part, into which the extension protrusion 94 is inserted, inside the base part 101. The guide groove part 104 according to the second embodiment includes a first groove part 105 and a second groove part 106. The first groove part 105 and the second groove part 106 are installed to be spaced apart from each other and forms a curved groove part through which the extension protrusion 94 is inserted to move in a curved direction.

The input protrusion 107 has a protrusion shape protruding from the base part 101 and is located outside the mounting housing part 17. Thus, the operator holds and rotates the input protrusion 107, or the input protrusion 107 is connected to a separate driving device to rotate the base part 101.

Hereinafter, an operation state of the operating device 5 according to the second embodiment of the present invention will be described in detail with reference to the accompanying drawings.

When the operation part 70 is unlocked, the moving part 100 rotates in one direction (counterclockwise direction in FIG. 10) due to power received through the input protrusion 107. Since the position of the extension protrusion 94 inserted into the guide groove part 104 changes due to the rotation of the base part 101, the rotation body 92 rotates about the hinge protrusion 88.

As illustrated in FIG. 10, since the rotation body 92 rotates in a direction away from the operation part 70, the restraint protrusion part 96 of the locking part 90 is separated from the restraint groove part 72 of the operation part 70, and thus the operation part 70 is unlocked. Thus, the operator extracts the operation part 70 from the glass part 10 and then may perform a maintenance operation.

When the movement of the operation part 70 is restricted, the moving part 100 rotates in the other direction (clockwise direction in FIG. 9). Since the position of the extension protrusion 94 inserted into the guide groove part 104 changes by the reverse rotation of the base part 101, the rotation body 92 rotates about the hinge protrusion 88.

Since the locking part 90 rotates in a direction of being in contact with the side surface of the operation part 70, the restraint protrusion part 96 of the locking part 90 is caught by the restraint groove part 72 of the operation part 70 to restrict the movement of the operation part 70.

As described above, according to embodiments of the present invention, the locking parts 40 or 90 are rotated by the rotation or movement of the moving part 100 to restraint the movement of the operation part 20 or 70 or easily release the restraint of the operation part 20 or 70, and thus maintenance costs can be reduced and working time can be shortened. Further, since only the operation part 20 or 70 may be separated from the glass part 10 and repaired or replaced, an operation of moving the glass part 10 together with the operation part 20 or 70 is omitted, and thus maintenance costs and work time of the operation part 20 or 70 can be reduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An operating device comprising:
   an operation part that transmits a manipulation signal;
   a frame part that has an inner hole part into which the operation part is configured to be inserted;
   a locking part that is configured to be rotatably installed in the frame part and is configured to be inserted into a side surface of the operation part through a rotation operation to restrain movement of the operation part; and
   a moving part that is connected to the locking part and rotates the locking part by linear movement or rotation;
   wherein the frame part includes:
   a first frame located on one side of the locking part;
   a second frame located on the other side of the locking part facing the first frame; and
   a hinge protrusion which protrudes in a direction from the second frame toward the first frame and in which the locking part is rotatably installed;
   wherein the locking part includes:
   a locking body that is rotatably installed in the hinge protrusion and is installed at a position facing the operation part inserted into the inner hole part;
   a protrusion part that protrudes from the locking body and is caught by a restraint groove part provided in a side surface of the operation part; and
   a connection hole part that forms a long hole, into which the moving part is inserted, inside the locking body.

2. The operating device of claim 1, wherein the moving part includes:
   a moving body that is movable in a linear direction; and
   a moving protrusion that protrudes from the moving body and is insertable into the connection hole part.

3. The operating device of claim 2, wherein the connection hole part is installed to be inclined with respect to a linear movement direction of the moving protrusion.

4. The operating device of claim 1, wherein the locking body and the hinge protrusion are provided as two locking bodies and two hinge protrusions, and the locking bodies are located on both sides of the operation part.

5. An operating device comprising:
   an operation part that transmits manipulation signal;
   a frame part that has an inner hole part into which the operation part is configured to be inserted;
   a locking part that is configured to be rotatably installed in the frame part and is configured to be inserted into a side surface of the operation part through a rotation operation to restrain movement of the operation part; and
   a moving part that is connected to the locking part and rotates the locking part by linear movement or rotation;
   wherein the frame part includes:
   a first frame located on one side of the locking part;
   a second frame located on the other side of the locking part facing the first frame; and
   a hinge protrusion which protrudes in a direction from the second frame toward the first frame and in which the locking part is rotatably installed;
   wherein the locking part includes:
   a rotation body that is rotatably installed in the hinge protrusion and is installable at a position facing the operation part inserted into the inner hole part;
   an extension protrusion that protrudes from the rotation body, is insertable into the moving part, and is moved together with the rotation body by the rotation of the moving part; and
   a restraint protrusion part that protrudes from the rotation body and is caught by a restraint groove part provided in the side surface of the operation part.

6. The operating device of claim 5, wherein the moving part includes:
   a base part that is rotatably installed at a position facing the extension protrusion; and
   a guide hole part that forms a hole part, into which the extension protrusion is inserted, inside the base part.

7. The operating device of claim 5, wherein the rotation body and the hinge protrusion are provided as two rotation bodies and two hinge protrusions, and the rotation bodies are located on both sides of the operation part.

* * * * *